Patented Apr. 25, 1939

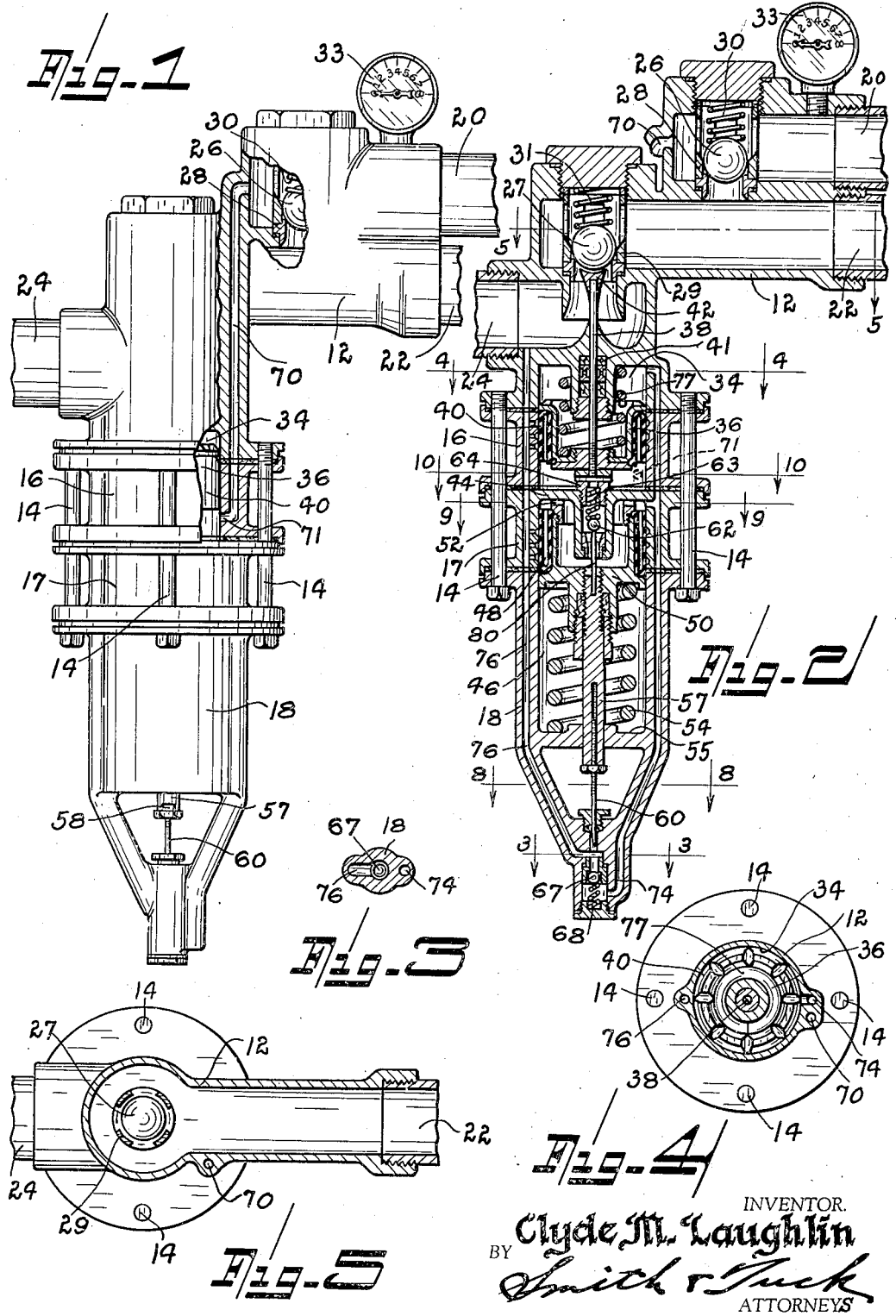

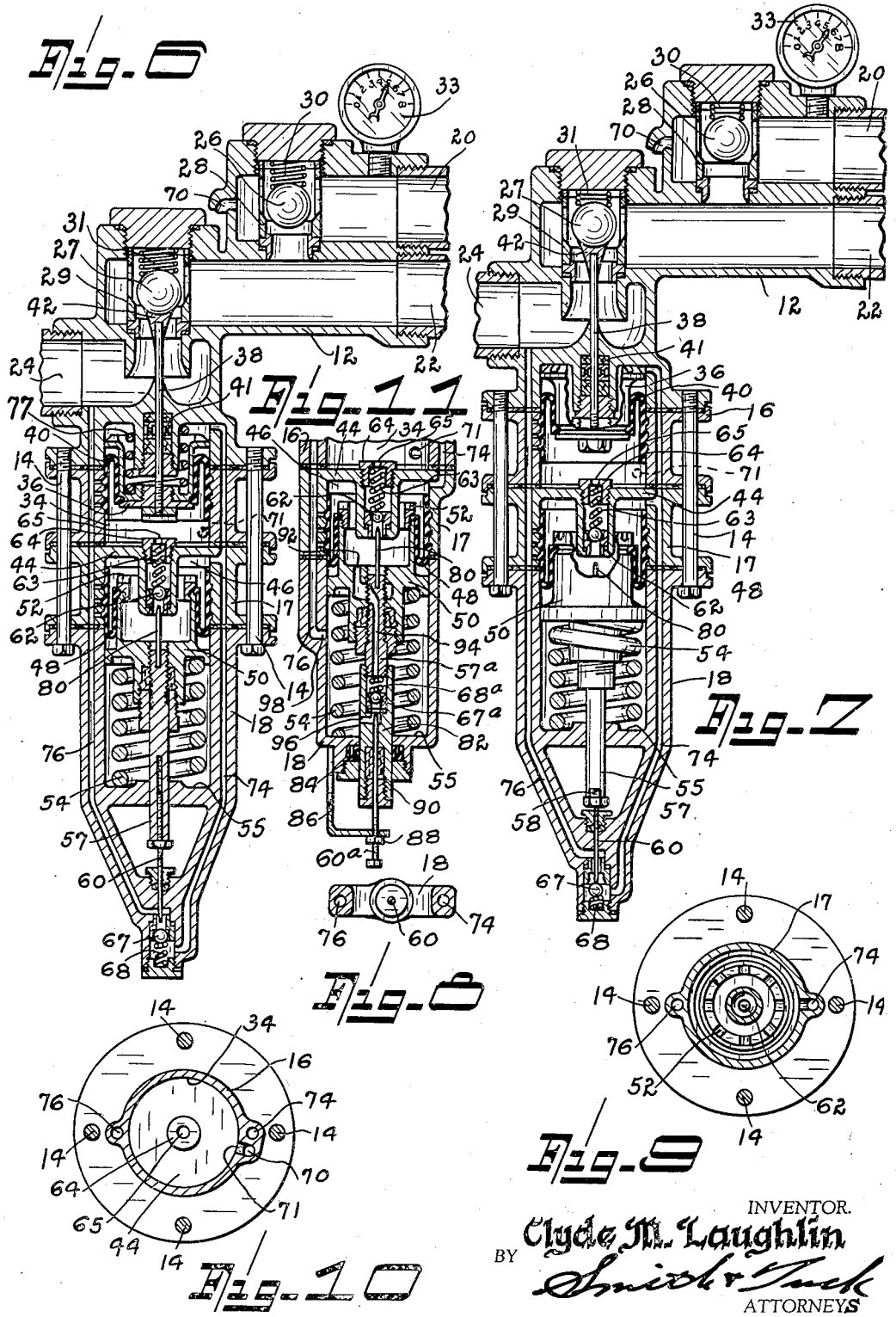

2,155,558

UNITED STATES PATENT OFFICE 2,155,558

PRESSURE REGULATOR

Clyde M. Laughlin, Wenatchee, Wash.

Application May 23, 1938, Serial No. 209,608

6 Claims. (Cl. 137—153)

My present invention relates to the art of control means for high pressure fluid lines and more particularly to a pressure regulator.

One field to which my present pressure regulator is especially adaptable is that encountered in high pressure spraying operations. It has been found that spraying of trees and cultivated crops can best be effected by the extremely fine atomization which occurs when relatively high pressures are used on the spray lines. Pressures up to eight hundred pounds are quite common. However, when such excessive pressures are used it is necessary to employ unusual types of pumps. As spraying is usually done with water as the carrying vehicle, the fact that water is noncompressible makes necessary the provision of very sensitive means for the control of pressure which is affected by the opening or closing of one or more of the numerous spray lines or guns that may be in use. Ordinarily, to build up such high pressures it is necessary to use a positive displacement pump; usually a multi-plunger pump is used. Here a definite displacement of liquid is obtained and, if the pump operates to build up a relatively high pressure in a substantial flow of liquid and then suddenly the outlet for part of that liquid is closed, as in closing a spray gun, it is necessary to provide relief means that will prevent the building up of dangerous pressures. Then, on the other hand when one or more spray guns are suddenly opened and commence discharging the liquid fed to it under such high pressure, the regulating means must be sufficiently sensitive to immediately provide the increased amount of high pressure liquid necessary to maintain the desired pressure at the spray orifice of the various, and often numerous, spray guns used.

The principal object of my present invention is, therefore, to provide a high pressure regulator which is so delicately balanced that it will respond instantly to the requirements of either unloading the line so that excessive pressure will not be built up or to quickly supply additional liquid so that the desired pressure can be maintained.

A further object of my present invention is to provide means for the purpose indicated that will be relatively simple in construction so that it can be expected to operate over long periods with the minimum of possible failure or malfunctioning.

Still another object of my present invention is to provide a pressure regulator which can be easily adjusted to maintain a given pressure on the discharge line.

Another important object of my present invention is to provide a pressure regulator of such simplified design so, in case repair or adjustment becomes necessary, that the device can be quickly taken apart or the adjustment conveniently made.

Other and more specific objects will be apparent from the following description taken in connection with the accompanying drawings, wherein Figure 1 is a side elevation of a pressure regulator made after the teachings of my present invention, certain parts of which are broken away and shown in section to better illustrate its construction.

Figure 2 is a view, taken in the same sense as Figure 1 but along the axis of the device; showing the various parts in section, in the position each will assume when the device is not under pressure loading.

Figure 3 is a cross-sectional view taken along the line 3—3 of Figure 2.

Figure 4 is a cross-sectional view taken along the line 4—4 of Figure 2.

Figure 5 is a cross-sectional view taken along the line 5—5 of Figure 2.

Figures 6 and 7 are vertical, sectional views taken in the same sense as Figure 2 but showing, in Figure 6, the building up of pressure in the service line, and in Figure 7, lowering or unloading of pressure from the pump.

Figure 8 is a cross-sectional view taken along the line 8—8 of Figure 2.

Figure 9 is a cross-sectional view taken along the line 9—9 of Figure 2.

Figure 10 is a cross-sectional view taken along the line 10—10 of Figure 2.

Figure 11 is a fragmentary view, showing in section, a modified form for the lower portion of my regulator.

Referring to the drawings, throughout which like reference characters indicate like parts, 12 designates the upper housing member of my regulator. Secured to member 12 as by bolts 14 are in order the upper and lower intermediate housing members 16 and 17 respectively and the lower housing member 18. Leading into the upper housing member 12 is a service or discharge pipe 20 which may lead to any suitable discharge arrangement, usually a plurality of spray hoses fitted with nozzles. Also leading to housing 12 is a second pipe 22 which leads fluid from a source of pressure such as a force pump normally used in spray work. On the opposite side of the housing, preferably, is the overflow pipe 24. This pipe is normally led back to the tank from which the spray material is drawn and normally operates under no pressure excepting the slight amount required to place the fluid back into the tank from which it is drawn by the pump.

Housing 12 is further provided with two spring seated check valves as 26 and 27. These are normally seated in removable seats as 28 and 29 respectively and are positioned therein as by the compression springs shown at 30 and 31. Suitable retaining means are employed to hold these springs in position. Also freely communicating with the discharge pipe 20 is a pressure gauge 33 which indicates the pressure in the discharge line.

Disposed within a cylinder formed in part in the lower portion of housing 12 and employing the entire extent of upper intermediate housing member 16 is cylinder 34. Within cylinder 34 is disposed piston member 36. This consists of a plurality of supporting discs secured to stem 38 and which serve as an operating means for the preferably resilient piston proper 40. This member is normally made of rubber and follows the general teachings of piston cups to the end that they can be expected to retain the relatively high pressures encountered in devices of this character and to provide an accurate seal for the same so that leakage will not occur therein which might otherwise affect the delicate balance of such equipment. It will be noted from the various figures that piston stem 38 is provided with suitable packing and packing gland as at 41. The upward extremity of stem 38 is machined to serve as a partial seat for check ball 27, normally it being desirable to employ a special fitting as 42 at the end of stem 38.

The lower intermediate housing member 17 is provided at its upper end with a fixed closure or head as 44 which serves to separate chamber 34 from the lower chamber 46. Chamber or cylinder 46 is provided with a flexible piston assembly at 48 similar to that employed in chamber 34. This member is held on its inner margin by the reciprocating piston assembly 50. Piston 50 is provided at its upper end with a castelated top at 52 so that, even though driven up against wall 44, it will not serve to prevent the free flow of liquid. The lower surface of piston 50 is used as an abutting surface for the main compression spring 54, this spring seats at its opposite end on wall 55 and thereby is in position to constantly urge piston 50 upwardly. This piston assembly is, like the upper assembly, provided with a downwardly extending stem 57 which is deformed at 58 so as to provide a seat for an adjusting wrench used to adjust the pressure setting of the regulator.

The lower end of stem 57 is drilled and threaded so as to adjustably secure in position the needle stem 60 protruding therefrom. This is normally locked in its adjusted position by a suitable lock nut as shown. This small stem 60 is also provided with suitable packing and gland nuts so as to prevent any leakage.

Disposed within a depending housing from plate 44 is a valve assembly consisting of the check valve 62 and its operating spring 63, preferably a removable valve seat is used as shown in the drawings and the compression spring 63 is held in place by a nut 64 which is provided with an opening as 65, thus providing, under certain conditions, for the flow of fluid between cylinders 34 and 36.

At the lower extremity of housing 18 I provide another check valve arrangement in the ball check 67 and its seating spring 68. Here again I prefer to provide a separate seat for the valve. In order to assure the proper transfer of pressure in my regulator I provide three separate release channels or passageways, one originating in the upper portion of housing 12 is indicated probably most fully in Figure 1 at 70. In Figures 2, 6, and 7 this passageway is shown at its origin but is otherwise broken away. The opposite end of passageway 70 is shown in Figure 1 and its relative position is indicated by the dashed circle at 71 in Figures 2, 6, and 7. Communicating between the upper portion of chamber 34, and chamber 46 and the chamber at valve 67 is another passageway 74. Further, I provide a third passageway as 76 connecting the upper side of the passageway of valve 67 with the overflow pipe 24. These channels pass through the intermediate housing section where adequate provision is made in the gasket employed at the points of passage.

In Figures 2 and 6 I have illustrated a compression spring 77 disposed to depress piston 36. This construction insures against undue chattering of piston 36, withdraws seat 42 from contact with ball 27 and causes piston 36 to return to its lower position.

In Figure 11 I have shown a modified form for the lower portion of my regulator. In this arrangement passageway 74 joins only the upper portion of cylinder 34 and the upper portion of chamber 46 and instead of the lower portion of passageway 74, as is shown in Figures 2, 6, 7, I provide an opening 92 to a new passageway 94 which conveys water from the lower portion of chambers 46 through the check valve 67a into the chamber occupied by spring 54. From here a new port 98 is provided which communicates with passageway 76 which again is reduced in its extent in that it does not now need to go to the bottom of the device. In this new arrangement the upper set valve 62 and its associated parts are the same as in the other showings and the unseating pin 80 functions as in the former structure. Pin 57 has been modified and the modified stem as indicated at 57a is provided with a passageway through its center which communicates with port 92. The ball check 67a and its seating spring 68a are housed within a new member 82 which is preferably attached to member 57a by threading the same thereto. A discharge passageway for fluid passing through check valve 67a is provided in port 96. The new valve stem consisting of members 57a and 82 must of necessity move with piston 50 and as the chamber for spring 54 will now be filled with liquid at times it is necessary to provide a stuffing box or gland at 84 and further it is necessary to provide a second gland as 90 for the new form of valve operating rod or needle stem 60a which is adjustably held in bracket 86 by means of the lock nut 88.

Method of operation

Figure 2 shows my device in the position assumed by the various parts when pressure is not applied to line 22. In this condition valves 26 and 27 are resting on their seats under urging of springs 30 and 31 respectively. The stem seat 42 is not in contact with ball 27. Piston 36 is in its lowermost position abutting nut 64 and the lower piston 50 is moved upwardly under urging of spring 54 to the fullest extent of its travel until the castelated upper surface abuts plate 44. Valve 62 is off its seat and valve 67 is seated on its seat by spring 68.

Assuming that the device is going to operate at a pressure of from 500 to 525 pounds per square inch, a suitable adjustment is made of stem 57, in keeping with the pressure desired, by applying a wrench to the deformed portion 58. It is customary to have a pump constantly serve line 22 with a greater volume of fluid and under a pressure higher than that desired, consequently part of this liquid must be by-passed out to the overflow pipe 24. This is accomplished according to the showing of Figure 6 and Figure 7.

Referring to Figure 6 the gauge shows a pressure of 500 pounds on the discharge line 20. Under such conditions, of course the pump has forced water through pipe 22 upwardly unseating ball 26 and making the desired registry on the gauge. However, a portion of the liquid, under pressure has been by-passed down through passageway 70, through the intake port 71 into the bottom of cylinder 34 where it exerts a pressure on the underside of the piston assembly 36–40 thus urging the same upwardly. Part of the same fluid under pressure passes through opening 65 in nut 64 down past the valve 62 (which is open as shown in Figure 2) into the top of chamber 46. The piston 50 is forced downwardly against the compression spring 54 until the upward force of the compression spring 54 and the fluid urging piston 50 downwardly hold the piston in a balanced position. Piston 50 has moved only a slight distance downward and the check valve 62 is still open. The fluid which is under pressure then flows from the top of chamber 46 and fills passageway 74 with fluid under the same pressure as is in the chambers 34 and 46. The fluid in passageway 74 flows upwardly and out into the top of cylinder 34 and onto the top of piston 36. Therefore piston 36 is held in its down position as it has the same pressure on both its top and bottom faces. The desired volume of fluid under 0 to 500 pounds pressure will thus pass out the discharge pipe 20 as the check valve 27 is closed, which does not allow any of the fluid to pass out the overflow pipe 24.

Stem 57 is positioned so that when a pressure of a predetermined amount, as for instance 500 pounds as is shown in the drawings, is reached, it will force piston 50 down until the check valve 62 is seated thus closing off any communication between the lower portion of cylinder 34 and chamber 46. The piston 36 is still at its lowest position as the pressure on its upper and lower faces is the same.

If a pressure higher than 500 pounds is built up in the discharge pipe 20 the fluid causing the pressure over the 500 pounds per square inch is passed out through the overflow pipe 24. When this extra pressure is built up it forces piston 50 down until the check valve 62 is closed.

When valve 62 is closed the fluid in the upper portion of chamber 34, the fluid in chamber 46 and the fluid in passageway 74 is in a locked state as no further liquid can be passed into these chambers. If a greater pressure is now built up in discharge pipe 20 this additional pressure will enter chamber 34 through passageway 70 and force piston 36 upwardly. The trapped liquid, above piston 36, will flow through passageway 74 and exert an additional pressure upon piston 50 and force it downwardly against compression spring 54. Thus the more the pressure exceeds 500 pounds per square inch in the discharge pipe 20, the higher check valve 27 will open and the further piston 50 will be forced downwardly. Check valve 27 will open and close sufficiently to normally pass off just the amount of water required to keep the pressure in the discharge pipe between the predetermined limits.

When 525 pounds pressure is built up in the discharge pipe 20, piston 50 will be forced down so that the needle stem 60 will open the ball check valve 67 thus permitting a free flow of liquid from passageway 74 into passageway 76. When the valve 67 is opened the liquid trapped above piston 36 is relieved to atmospheric pressure and the fluid under the 525 pounds pressure will immediately push piston 36 to the top of its stroke and open valve 27 to its highest position to let a great volume of fluid pass to the overflow pipe 24. At the same time when the pressure is released above piston 36 it is also relieved above piston 50 and under the urging of the compression spring 54 piston 50 will travel upward to again allow spring 68 to seat the valve 67.

When the regulator is working and is having a fluctuating pressure in discharge pipe 20, valve 27 will be closed when the pressure is from 0 to 500 pounds. From 500 to 525 pounds the valve will alternately open and close to keep the pressure between these limits but if the pressure rises to 525 pounds, valve 27 will open to its fullest extent to bring the pressure back to between 500 and 525 pounds.

The lower piston and valve assembly shown in Figure 11 operates virtually in the same manner.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

Having thus fully described my invention, what I claim as new and desire to secure by Letters Patent is:

1. In a liquid pressure regulator having an inlet chamber an outlet chamber and an intermediate check valve, an overflow port and a pressure closed valve between the inlet chamber and the overflow port, the combination with a casing having a pressure chamber communicating with the outlet chamber, a piston in the pressure chamber having a stem adapted to unseat the overflow valve, said casing having a second pressure chamber and a balancing piston therein adapted to co-act with the first piston, and a spring-closed check valve controlling communication between said pressure chambers.

2. The combination in a liquid pressure regulator having inlet and outlet chambers and an overflow port, a pressure-opened valve between the inlet and outlet chambers, and a pressure-closed valve between the inlet chamber and the overflow port, of a casing having a pressure chamber communicating with the outlet chamber, a piston in the pressure chamber having a stem adapted to unseat the pressure-closed-valve, said casing having a second pressure chamber and a balancing piston therein adapted to co-act with the first piston, said casing also having a passage communicating with the overflow port and a spring-closed check valve in said passage, and a spring-seated check valve controlling fluid pressure between said pressure chambers.

3. In a liquid pressure regulator having an inlet chamber an outlet chamber and an intermediate pressure-opened check valve, an overflow port and a pressure-closed valve between the inlet chamber and said port, the combination with a casing having a pressure chamber communicating with the outlet chamber and a piston in said chamber having a stem adapted to unseat the pressure-closed valve, said casing having a second pressure chamber and a balancing piston therein to co-act with the first piston, said pressure chambers having a communicating passage and also a spring closed between them, a stem on the balancing piston adapted to unseat said spring-closed valve, said chambers also having a passage communicating with the overflow port and a spring closed check valve in said passage, and a stem on the balancing piston adapted to unseat the last mentioned check valve.

4. In a liquid pressure regulator having an inlet chamber an outlet chamber and an intermediate pressure-opened valve, an overflow port and a pressure-closed valve between said port and the inlet chamber, the combination with a casing having communicating pressure chambers and a spring-seated check valve therebetween, a piston in one pressure chamber adapted to unseat the pressure-closed valve, a balancing piston in the other chamber and said pressures having a communicating passage, said pressure chambers also having a communicating passage to the overflow port and a spring closed check valve in said passage, and means on the balancing piston for alternately opening said spring closed check valves.

5. In a liquid pressure regulator having an inlet chamber an outlet chamber and an intermediate pressure-opened valve, an overflow port and a pressure-closed valve between the inlet chamber and said port, the combination with a casing having a pressure chamber communicating with the outlet chamber, a balancing chamber communicating with said pressure chamber, and an overflow duct communicating with said pressure chamber and said balancing chamber, means within the pressure chamber adapted to unseat the pressure closed valve, a spring-closed valve closing communication between the pressure chamber and the balancing chamber, a spring closed valve in said duct, and means within the balancing chamber adapted to alternately unseat said spring-closed valves.

6. The combination with a casing having a pressure chamber and a balancing chamber and a spring-closed check valve therebetween, said casing also having an overflow duct and a spring-closed check valve therein, of a balancing piston in the balancing chamber, and said balancing piston having oppositely disposed and alined stems adapted to alternately unseat said check valves.

CLYDE M. LAUGHLIN.